United States Patent
Sadhukha et al.

(10) Patent No.: US 10,489,119 B2
(45) Date of Patent: Nov. 26, 2019

(54) CONNECTION BETWEEN APP AND WEB SITE

(75) Inventors: Shajib Sadhukha, Seattle, WA (US); Amit Kumar, Redmond, WA (US); Michael Van Snellenberg, Seattle, WA (US); Li Jiang, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 13/470,040

(22) Filed: May 11, 2012

(65) Prior Publication Data
US 2013/0304718 A1    Nov. 14, 2013

(51) Int. Cl.
*G06F 8/30*    (2018.01)
(52) U.S. Cl.
CPC ........................ *G06F 8/30* (2013.01)
(58) Field of Classification Search
CPC ........................................ G06F 8/30
USPC ............................... 707/705, 706
See application file for complete search history.

(56) References Cited

U.S. PATENT DOCUMENTS

| | | |
|---|---|---|
| 6,314,565 B1 * | 11/2001 | Kenner et al. ............. 717/171 |
| 7,836,303 B2 | 11/2010 | Levy et al. |
| 7,895,296 B1 | 2/2011 | Dayan |
| 8,578,166 B2 * | 11/2013 | De Monseignat et al. ... 713/175 |
| 2005/0187878 A1 * | 8/2005 | Khaishgi et al. ............. 705/58 |
| 2007/0209080 A1 | 9/2007 | Ture et al. |
| 2008/0082955 A1 | 4/2008 | Andreessen et al. |
| 2009/0165109 A1 | 6/2009 | Hird |
| 2010/0077048 A1 * | 3/2010 | Czyzewicz ........... H04L 63/102 709/206 |
| 2012/0084835 A1 * | 4/2012 | Thomas ................ G06F 21/128 726/3 |
| 2012/0180029 A1 * | 7/2012 | Hill et al. ...................... 717/135 |
| 2012/0303491 A1 * | 11/2012 | Hill et al. ...................... 705/27.2 |
| 2012/0324010 A1 * | 12/2012 | Pinches .................. G06Q 90/00 709/204 |
| 2013/0031356 A1 * | 1/2013 | Prince ................. H04L 63/0823 713/151 |
| 2013/0290369 A1 * | 10/2013 | Sayers et al. ................. 707/769 |

OTHER PUBLICATIONS

Byron, https://searchengineland.com/16-differences-between-google-mobile-desktop-search-results-in-2012-130463 (Year: 2012).*

(Continued)

*Primary Examiner* — Matthew J Ellis
(74) *Attorney, Agent, or Firm* — Holzer Patel Drennan (57) ABSTRACT

An application ("app") may be associated with a web site, so that an online service may use the connection between the app and the web site. In one example, the online service is an information provider, such as a search engine or advertising engine. The online service provides a web administrator portal, through which a webmaster provides or generates a secret code. The webmaster gives the secret code to an app developer, who gives the code to an app store when the app is published. If the service provides information about the web site (e.g., as a search result or ad impression), the service may also provide an indication of the app, since the use of the code represents confirmation by both the webmaster and app developer that a relationship exists between the web site and the app.

19 Claims, 5 Drawing Sheets

(56) References Cited

OTHER PUBLICATIONS

"AuthSub for Web Applications", Retrieved at <<https://developers.google.com/accounts/docs/AuthSub>>, Retrieved Date: Mar. 6, 2012, 9 pages.
"Bidirectional Mapping Between Applications and Network Content", U.S. Appl. No. 13/470,236, filed May 11, 2012, 37 pages (32 pages of text plus 5 drawing sheets), Assigned to Microsoft Corporation, Inventors: Zhaowei Jiang, Steven Macbeth, Syed Hasan, and Jacob Sabulsky.

* cited by examiner

CONNECTION BETWEEN APP AND WEB SITE

BACKGROUND

Online services are typically provided in the form of web sites, with which a user can interact by using a generic communications program, such as a web browser. Recently, however, the providers of many online services have begun to provide apps through which their services may be accessed. For example, a service such as the Macy's online store may have a web site that can be accessed through a browser, but may also provide a Macy's app that provides an enhanced, or more streamlined, user experience. There may be several versions of this app, which may be optimized for specific devices or platforms. Since people are increasingly relying on devices with small form factors (such as smart phones and tablets), service-specific apps can make optimal use of a device's display real estate and other features in ways that a general-purpose web browser might not be able to do.

A user might encounter an online service through a search result, an ad, page surfing, or through some other process. E.g., a search for "department stores" might return the Uniform Resource Locator (URL) of the Macy's web site as a result, or a paid ad impression might contain a link to the Macy's web site. If a Macy's shopping app exists, then the app might be a more useful result than the web site. However, it is commonly the case that a link to the app is not provided. The reason that the link is not provided is often because it is not clear to the information provider (e.g., the search engine or advertising engine) which is the relevant app to list as a result.

SUMMARY

A web site administrator and an app provider may mutually identify a particular web site as being connected with a particular app. In this way, when the information provider wants to identify a service to a user, the information provider can provide both a link to the web site and a link to the app, knowing that the app and the web site both represent the same underlying service.

In order to establish a relationship between a web site and an online service, an information provider provides a web administrator portal, which is a mechanism through which the information provider may exchange various information with a web site's webmaster. For example, the information provider might be the MICROSOFT BING service, and the web site in question might be yelp.example.com. In this example, the site administrator, or webmaster, for yelp.example.com uses the web portal to tell the BING service information about yelp.exapmle.com that the BING service might want to use when responding to search requests. The web portal may provide a way to enter or generate secret codes. In order to identify an app as being associated with a web site, the administrator uses the web portal to enter or generate a secret code, and provides the code to the developer of an app. The information provider creates a record of the code, and uses the record to recognize, as being associated with the web site, those apps that are associated with that code.

When the app developer provides the app to an app store, the developer provides the app store with the code that was given to him or her by the web site administrator. The app store then publishes the app, and also makes the code available to appropriate information providers, such as search engines. (In one example, the app store and the information provider are operated by the same entity—e.g., as in the case of the MICROSOFT BING search engine and the MICROSOFT WINDOWS PHONE marketplace—although the information provider and app store could be different entities.) Since an information provider has learned (e.g., through its web administrator portal) which codes are associated with a particular web site, the information provider may use these codes to identify the apps that are legitimately associated with such a web site. The information provider may then include the apps among the information that the information provider provides. E.g., in the example case in which the information provider is a search engine, the information provider may provide the Yelp app alongside the yelp.example.com web site in a set of search results.

Association of apps with web sites may involve continued mutual assent between the web site administrator and the app developer. The web site administrator expresses his or her assent to have an app associated with his or her web site by giving a secret code to a particular app developer. The app developer expresses his or her assent to have an app associated with the web site by providing the secret code to the app store when the app is published. Either the web site administrator or the app developer can revoke assent: The web site administrator may invalidate the code, or the app developer may tell the app store to disassociate the code with his or her app (or may unpublish the app and then republish it without the code).

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Many web services are accessed through service-specific applications (apps). For example, services such as yelp.com, the Macy's online store, the Redbox video rental system, etc., may have apps that help users to access these online services. On devices with small form factors (e.g., smart phones, tablets, etc.), it may be particularly convenient to access a service using the app for that service rather than by visiting the service's web site with a web browser, since the app may make optimal use of the devices' small screens, input mechanisms, and device-specific feature sets.

In many cases, the user learns about a service through search results, an ad, or some other mechanism. Typically, a user first learns of an online service by learning of the service's web site. For example, a search for "DVD rentals" might return the redbox.com website. It might make more sense for the user to access the Redbox DVD rental service through the Redbox app, but search engines generally do not return apps as search results. One reason why search engines generally do not return apps is that they may not know which app is genuinely associated with the web site. There could be a rogue app that has the word "redbox" in its name or in a tag. Or, there could be a legitimate app that has the word "redbox" in its name or tag, but that is not the official app associated with the Redbox service. Since search engines, advertising engines, and other information providers generally do not know which app is associated with a particular web site result, these information providers generally do not provide apps as alternatives to the web site results.

The subject matter described herein provides a way of associating an app with a web site. When a web site and an app have been verifiably associated with each other, an information provider can present both a web site and its associated app.

In order to associate a web site with an app, an information provider provides a web administrator portal. The web administrator portal is used by a service to exchange information between the information provider and the administrator, or webmaster, of a web site. For example, services such as the BING service from Microsoft Corporation, and the Google search engine from Google, Inc., offer a "webmaster tools" portal, where a webmaster can (upon verification that the webmaster controls the site) view statistics about the type of queries that returned the web site as a result, the number of clickthroughs for those results, etc. In accordance with the subject matter herein, the web administrator portal may allow a webmaster to generate or provide a secret code, which will be used to identify legitimate apps to the information provider. The codes are stored, so that they can later be recognized as being indicative of apps that are legitimately associated with the web site. The webmaster gives the code to the developer of an app that is associated with the web site. When the app developer publishes the app (e.g., by posting the app at an app store, such as WINDOWS PHONE MARKETPLACE, the iTunes store, or Amazon Appstore for Android), the developer provides the code to the app store, thereby indicating that the app is associated with the code.

The app store may then advise the information provider of the connection between the app and the code. In one example, the app store and the information provider are the same entity (e.g., in the case of WINDOWS PHONE MARKETPLACE and the BING service, both of which are operated by Microsoft Corporation), in which case it is relatively simple for the app store to advise the information provider of the relationship between the app and the code. In another example, the app store and the information provider are separate entities—e.g., the iTunes store operated by Apple might advise Google of the relationship between an app and a code, so that the Google search engine could use this relationship when returning results. When the information provider learns that the code has been associated with the app, the information provider may use this relationship in responding to search results. For example, the webmaster of the redbox.com web site might create the code 12345 on the BING service's webmaster tools portal, and might give the code to the developer of the official redbox app for a WINDOWS PHONE device. When the app developer creates the app and publishes the app on WINDOWS PHONE MARKETPLACE, WINDOWS PHONE MARKETPLACE notifies the BING service of the relationship between the app and the code. If a user enters a query for "DVD rentals" into the BING search engine and the search engine returns redbox.com as a result, the search engine may also return Redbox app as a result, since the relationship between the app and the website is now known to the BING search engine.

It is noted that the process of a webmaster's giving a secret code to an app developer, and the app developer's providing the code when the app is published, represents mutual assent to the app/web-site relationship by both the webmaster and the app developer. The webmaster indicates his or her assent by giving out the code to the app developer, and the app developer indicates his or her assent by using the code when the app is published. Either party may revoke the assent. The webmaster can use the web administrator portal to delete or revoke the code, and the app developer can remove the code from the published app, or can remove the app from the app store and then republished the app without the code. Either action would indicate that mutual assent to the app/web-site relationship no longer exists.

Figure 1:
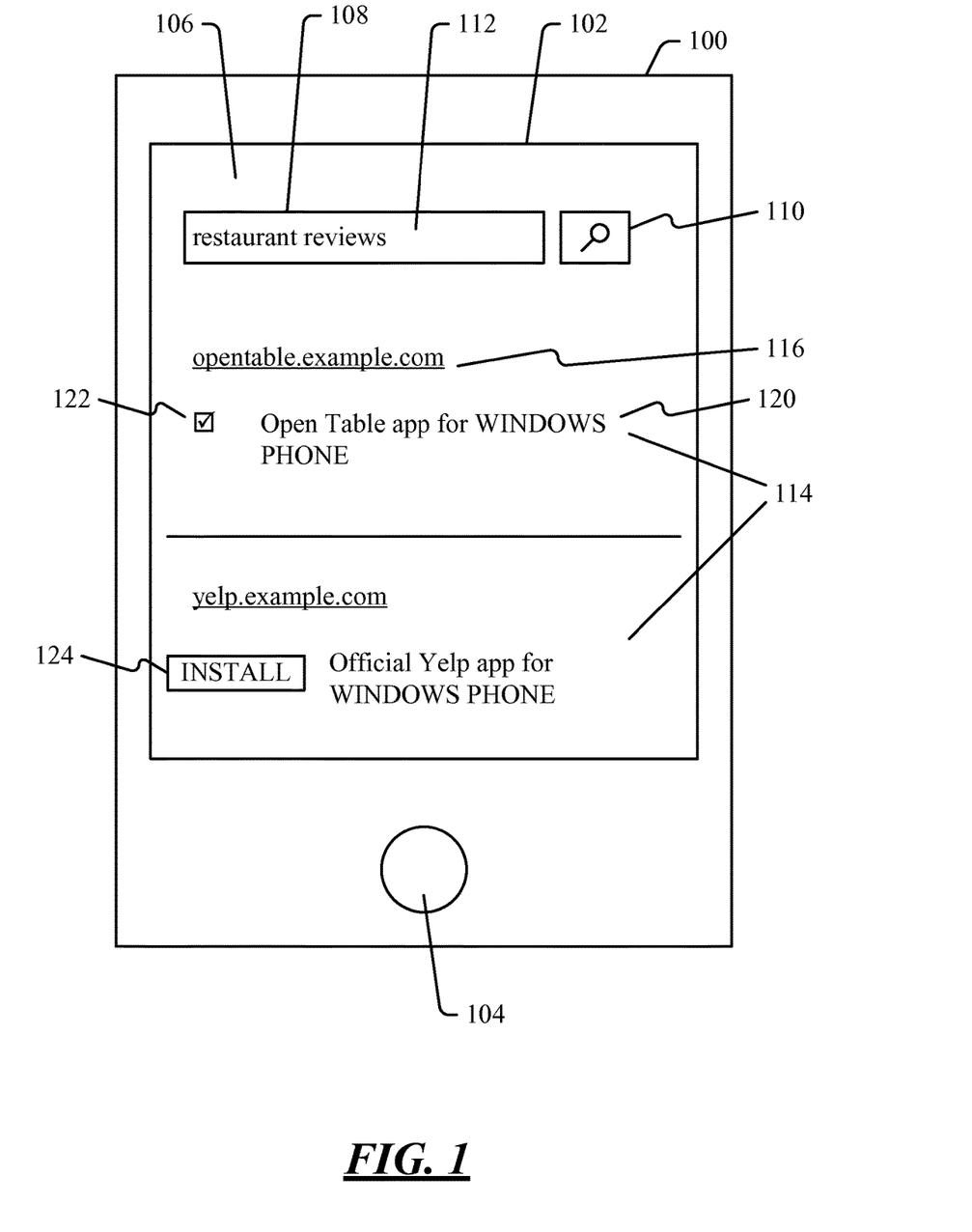
FIG. 1 is a block diagram of an example user interface of an information provider that indicates web sites in association with their connected apps.

Turning now to the drawings, FIG. 1 shows an example user interface of an information provider that indicates web sites in association with their connected apps. Device 100 is a smart phone, tablet, handheld computer, or any type of device with some computing and communications capability. In the example shown, device 100 has a touch screen 102, which may be used as an input/output device. I.e., touch screen 102 may receive information through its touch-sensitive capability, and may also display information. Device 100 may also have an escape button 104, which may provide additional input capabilities. Commonly, pressing escape button 104 is interpreted by software on device 100 as a command to return to a home screen or desktop screen, although escape button 104 may be interpreted in any appropriate manner by software on device 100.

In the example of FIG. 1, the information that is displayed on touch screen 102 is the interface 106 of a search application. Interface 106 may include a search box 108 and a search button 110. A user may enter a query 112 into search box 108 to identify the information that he or she is seeking, and then may press or tap on search button 110 to request the information. (In another example, search box 108 implements an "incremental" search, where a search engine provides results while the user types, and modifies the results based on subsequent keystrokes.) In the example shown, the query 112 that is entered is "restaurant reviews".

Interface 106 of the search application provides results 114 in response to query 112. In this example, two results are shown, although the search application could generate any number of results. In order to provide the results, a client-side search application on device 100 may have contacted the server of a search engine. The results 114 that are displayed may be the results that the search engine deemed appropriate in response to query 112. The results shown include the services Open Table and Yelp. In the case of the Open Table result, the application displays the opentable.example.com web site 116, and also the Open Table app 120. The reason the search engine has provided both the opentable.example.com web site 116 and the Open Table app 120 together as part of a result is that the app and the web site have previously been associated with each other. The association between the web site and the app may be performed through a process which is described below in connection with FIG. 2, et seq.

Next to the Open Table app 120, an indication 122 may be shown. Indication 122 (which is shown in the example of FIG. 1 as a checkmark) indicates that the Open Table app is installed on device 100. Device 100, and/or the search engine with which device 100 communicates, may have software that detects whether a web site is associated with a version of an app that is appropriate for the device in question, and whether such an app is installed. (There may be a specific version of an app for the Apple iPhone, another for a WINDOWS PHONE device, another for an Android device, etc. Or, there may be specific versions of the application for particular models of smart phones, tablets, or other devices. A search engine can determine whether any version of an app associated with a web site is appropriate for the device in question before including the app in the search results.) In the Yelp result, the yelp.example.com web site is shown along with the official Yelp app. However, instead of a checkmark, the word "install" is shown (item 124) next to the app, thereby indicating that the app has not been installed. The word "install" may be an activatable button. Thus, interface 106 may allow a user to click on (or otherwise activate) the install button, thereby downloading and installing the Yelp app upon activation of the button. (In this context, an app, such as Open Table app 120, refers to a program that runs on a user's device, such a smart phone or tablet. An app may help a user to use a remote online service, but the app itself refers to the program that is installed on, and runs on, the user's device.)

Figure 2:
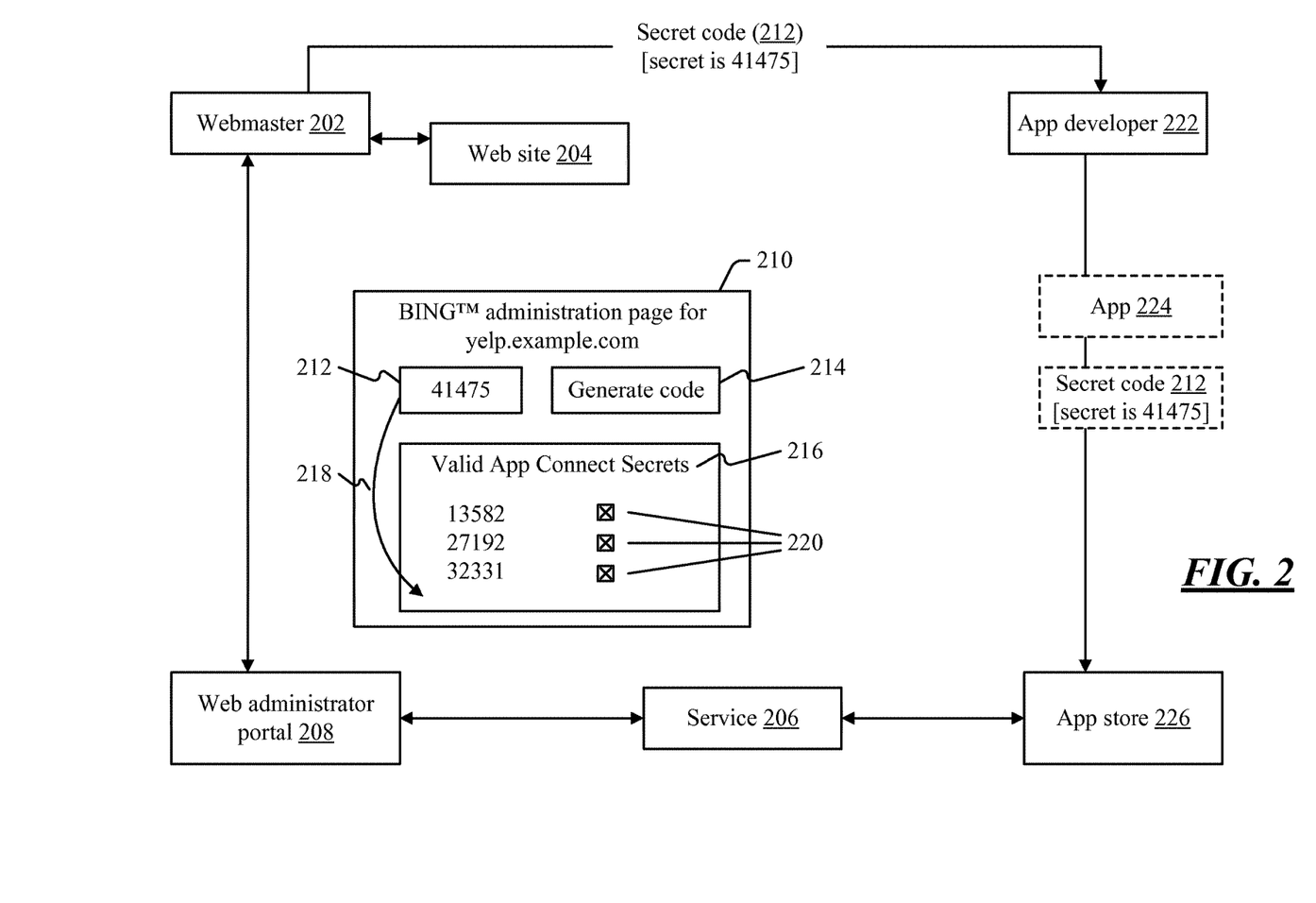
FIG. 2 is a block diagram of an example system in which a connection between a web site and an app may be established.

FIG. 2 shows an example system in which a connection between a web site and an app may be established. Webmaster 202 is the entity (e.g., a person, a group of people, a department, etc.) that has been verified as having control over web site 204. For example, webmaster 202 may be the programmer/maintainer of web site 204, or may be an Information Technology (IT) manager with a company to which web site 204 relates.

Service 206 is a service that interacts in some way with web site 204. For example, service 206 may be an information provider such as a search engine (e.g., the BING search engine, the Google search engine, etc.), an advertising engine, or any other appropriate type of service. In the example in which service 206 is a search engine, service 206 interacts with web site 204 in the sense that service 206 has one or more index entries relating to web site 204 and sometimes includes web site 204 in results that the search engine provides. In the example in which service 206 is an advertising engine, service 206 interacts with web site 204 in the sense that certain keywords or other information are associated with paid ad impressions for web site 204.

Regardless of the exact nature of service 206, service 206 may provide a web administrator portal 208, which service 206 may use to exchange information with webmaster 202. The BING service's "webmaster tools" page, and the Gooluge "webmaster tools" page, are examples of web administrator portals for the BING service and the Google service, respectively. Although web administrator portal 208 may have various functions exposed through various screens, FIG. 2 shows an example interface 210 that may be used for the feature of connecting apps with web sites.

Interface 210 shows the example administration page for a web site called yelp.example.com. (In the example shown in FIG. 2, web site 204 will be understood to be yelp.example.com.) The webmaster for yelp.example.com has already logged into web administrator portal 208, and has demonstrated in some manner his or her control over the yelp.example.com web site. (E.g., web administrator portal 208 may give webmaster 202 a specific file to post on the web site, or may give webmaster 202 a specific code to insert into the DNS record for the web site. Thus, webmaster 202 demonstrates control over the web site by posting the file or inserting the code. Once control has been demonstrated, web administrator portal 208 gives webmaster 202 access to certain information and functions concerning web site 204, even though these function would not be available to the general public.)

Interface 210 contains functionality to generate and/or enter a secret code 212. In the example shown, the secret code is 41475. This code might have been generated by clicking (or otherwise activating) a "generate code" button 214 on interface 210. Or, in another example, webmaster 202 might enter his or her own secret code. (However, in one example, web administrator portal 208 may impose certain format constraints on secret code 212, and may verify that the code conforms to these constraints before accepting the code.) Interface 210 contains a list 216 of "Valid App Connect Secrets". List 216 is the list of secrets that app developers can use to prove that their apps are associated with the yelp.example.com web site. In the example shown in FIG. 2, list 216 does not initially contain the code 41475, but that code can be added to the list (as indicated by arrow 218) after webmaster 202 enters or generates that code. Interface 210 may also contain delete buttons 220, which allow specific codes to be removed from the list. In effect, adding a code to list 216 constitutes webmaster 202's statement that an app bearing that code is legitimately associated with web site 204. Conversely, deleting a code from list 216 indicates that webmaster 202 is no longer willing to say that an app bearing that code is legitimately associated with web site 204.

Once a secret code has been entered or generated, that secret may be shared with app developer 222. App developer 222 is a person or entity who is writing software to be used with the service provided by web site 204. For example, app developer 222 may be a contractor who has been engaged to write the official version of the Yelp app 224 for the Blackberry smartphone (or the Apple iPhone, or the Apple iPad, or a particular model of Android tablet, etc.). App developer 222 might not be personally known to webmaster 202, and these two entities might even be quite distant from each other—e.g., webmaster 202 might be in the United States, and app developer 222 might be in India. Webmaster 202 provides secret code 212 (which, in this case, has the value 41475) to app developer 222. When app developer 222 has finished writing app 224, he or she publishes app 224 to app store 226. At the time that app developer 222 publishes app 224, he or she provides secret code 212 to app store 226, thereby indicating to app store 226 that app 224 is associated with secret code 212. (The dotted lines around app 224 and secret code 212 indicate that these components may be provided from app developer 222 to app store 226.) App store 226 is a service that can be used to purchase apps for a particular device or platform—e.g., the Apple iTunes store in the case of the Apple iPhone, iPod, or iPad; the WINDOWS PHONE marketplace in the case of WINDOWS PHONE devices; or the Amazon Appstore for Android in the case of phones and tablets that use the Android platform. By publishing app 224 to app store 226, the app may be made available for purchase and/or free download.

The relationship between secret code 212 and app 224 is known to app store 226, but normally is not made known to the general public. Rather, app store 226 may communicate back to service 206 the fact that app 224 has been published with secret code 212. Service 206 may then use the fact that app 224 has been uploaded with secret code 212 when service 206 provides information. For example, if service 206 is a search engine and has returned web site 204 as a search result, service 206 may also return app 224 as part of that result. The reason that service may return app 224 along with web site 204 in its results is that service 206 has learned (from app store 226) that app 224 is associated with the secret code 212, which, in turn, is known to be associated with web site 204.

It is noted that app store and service 206 may be operated by the same entity. For example, the WINDOWS PHONE marketplace and the BING service are both operated by Microsoft Corporation. In another example, however, app store 226 and service 206 might operated by different entities—e.g., app store 226 might be the Apple iTunes store and service 206 might be the Google search engine.

It is also noted that the technique shown in FIG. 2 may represent mutual assent to a web-site/app connection by both webmaster 202 and app developer 222. Webmaster 202 indicates his or her assent to have an app associated with his or her web site 204 when he or she gives out secret code 212 to app developer 222. On the other hand, app developer 222 indicates that he or she agrees to have his or her app associated with web site 204 when app developer 222 publishes app 224 with the secret code 212 that was given to him or her by webmaster 202. Either party may revoke this agreement. Webmaster 202 may revoke assent to the agreement by deleting the secret code from list 216. App developer 222 may revoke assent by either notifying app store 226 that secret code 212 is withdrawn from app 224, or may withdraw app 224 from app store 226 and then republish app 224 without the secret code.

Figure 3:
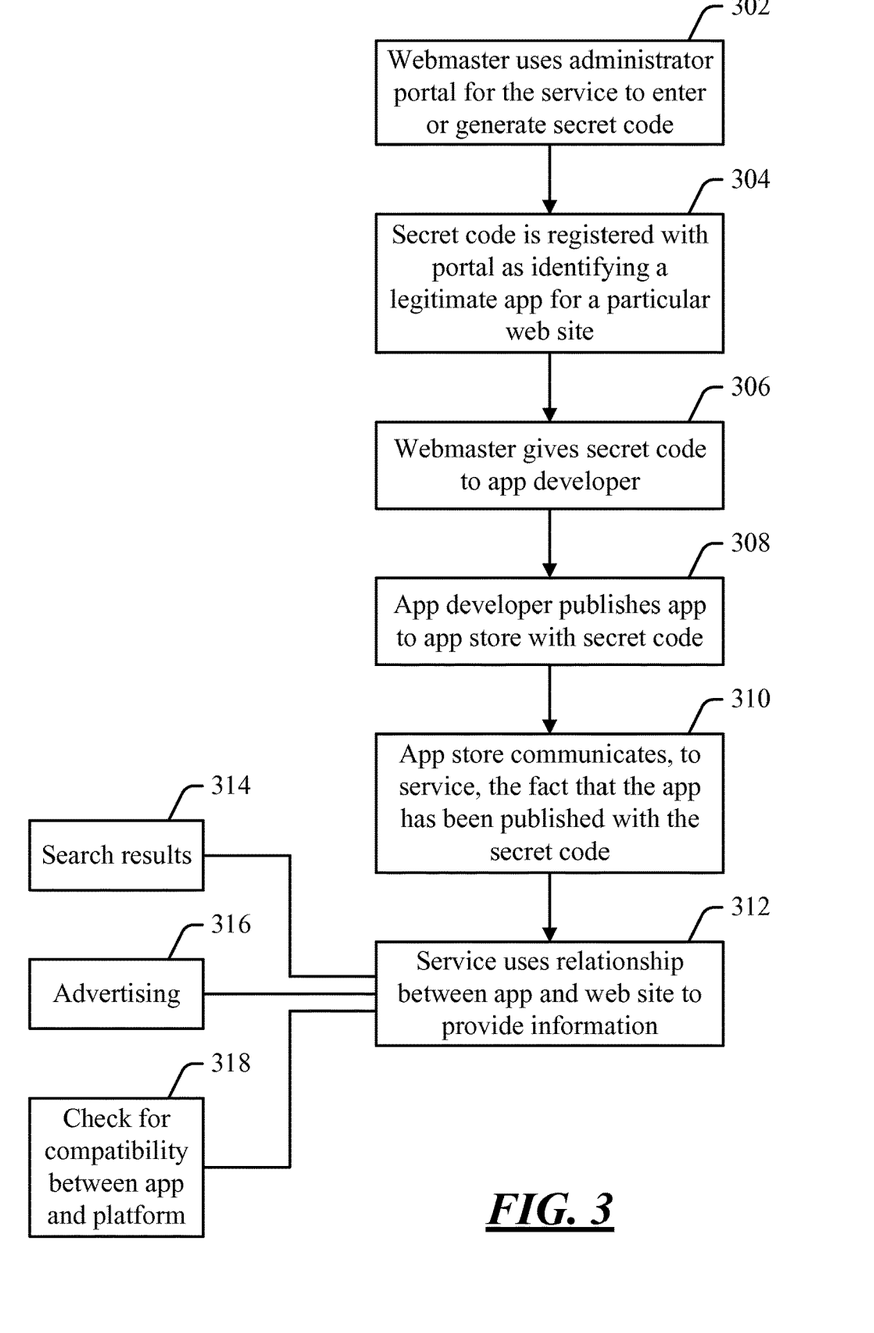
FIG. 3 is a flow diagram of an example process in which a web site may be associated with an app.
Figure 4:
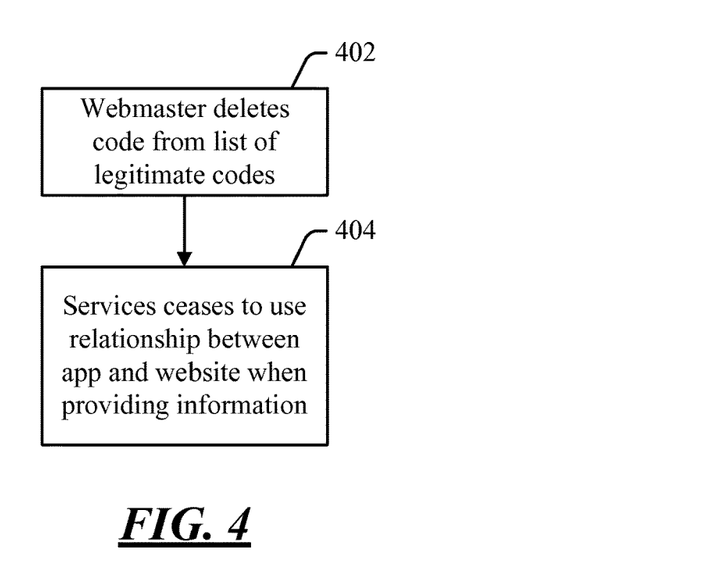
FIG. 4 is a flow diagram of an example process in which a webmaster severs the connection between a web site and an app.
Figure 5:
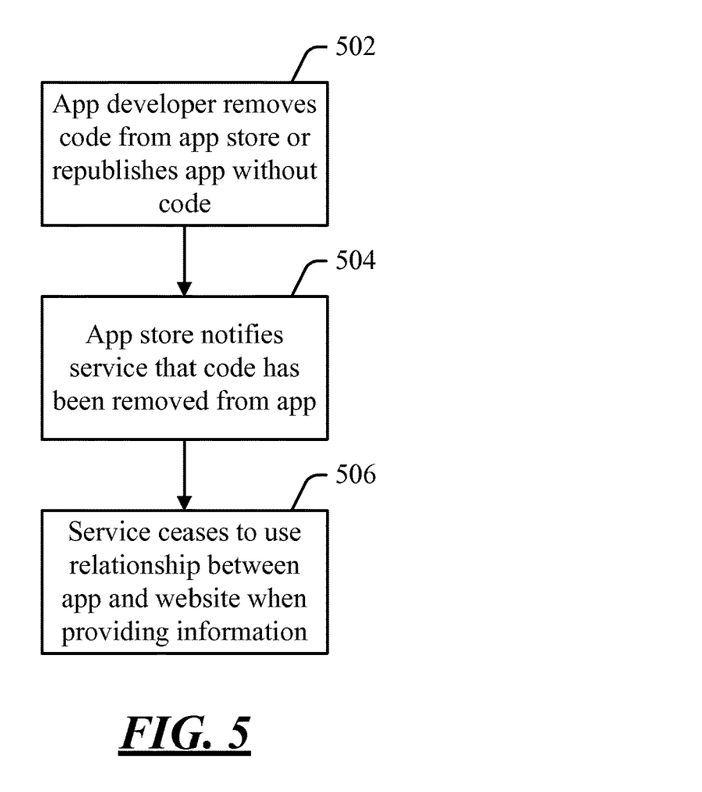
FIG. 5 shows an example process in which an app developer severs the connection between a web site and an app.

FIG. 3 shows an example process in which a web site may be associated with an app. Before turning to a description of FIG. 3, it is noted that the flow diagrams contained herein (both in FIG. 3 and in FIGS. 4-5) are described, by way of example, with reference to components shown in FIGS. 1 and 2, although these processes may be carried out in any system and are not limited to the scenarios shown in FIGS. 1 and 2. Additionally, each of the flow diagrams in FIGS. 3-5 shows an example in which stages of a process are carried out in a particular order, as indicated by the lines connecting the blocks, but the various stages shown in these diagrams can be performed in any order, or in any combination or sub-combination.

At 302, a webmaster uses a service's web administrator portal to enter or generate a secret code. The secret code that is entered or generated will later be used to identify an app as being associated with a particular web site that the webmaster controls. As noted above, before being able to use the web administrator portal in this manner, the webmaster may have previously established, to the satisfaction of the service, that he or she exercises control over the web site in question. At 304, the secret code that has been entered or generated is registered with the portal. Once registered, the secret code will be known to the service as being usable to identify an app that is legitimately associated with the web site that the webmaster controls. At 306, the webmaster gives the secret code to an app developer.

At 308, the app developer publishes an app to the app store with the secret code. For example, the app developer may visit a developer portal for an app store and may upload the app. The app store portal may then ask the developer to enter any codes that indicate a relationship between the app and a particular web site. The developer may then enter the code that was given to him or her by the webmaster. At 310, the app store communicates, to the service that was mentioned at 302, the fact that the app has been published with the secret code. Once the service receives this information, at 312 the service may use the relationship between the app and the web site as a basis for providing certain information. It is noted that, in one example, using the relationship between the app and the web site implies that that the service would show the user the web site, but not the app, in the absence of a relationship between the app and the web site. For example, it may be the case that a search engine indexes web sites, not apps, so the search engine's algorithm may actually be choosing a web site as being responsive to a search query. However, the search engine may decide to show the user the app, not based on having found the app algorithmically through the search engine's index, but rather based on having found the web site algorithmically and then having determined that the app has been indicated by both the webmaster and the app developer as being associated with the web site.

The example shown in FIG. 1, in which a search engine returns both a web site and its associated app as a search result, in an example of a service's using the relationship between an app and a web site to provide information (as indicated at block 314). However, any type of service may use this information in any appropriate manner—e.g., an advertising service may use the relationship to create an ad impression that includes both a web site and its associated app (as indicated at block 316). (In the case of an ad impression, it might be the case that the advertising service has been paid to create an impression of the web site in response to certain keywords. In this example, the advertising engine has determined that its algorithm calls for it to make an impression of the web site, not the app, so the indication of the app is an add-on to the impression of the web site. However, in another example, a service provider might pay or bid to have the advertising engine generate an impression of the app itself.)

Additionally, it is noted that when a service uses the relationship between a web site and an app to provide information, the service may determine whether an appropriate version of an app exists for the device on which the information is being requested (block 318). For example, if a user performs a search on an Android phone and the search engine finds that the yelp.example.com web site is responsive to the search query, the search engine may determine not only whether a Yelp app exists but also whether a Yelp app for the Android platform (or for that particular model of Android phone) exists. If an app exists for that model of phone, then the search engine may provide both the yelp.example.com web site and also the Yelp app for the phone as part of the search results. However, if a Yelp app exists—but not for that model of phone—then the search engine might refrain from including the Yelp app in the search results.

As noted above, once a connection between a web site and an app has been established, either the webmaster or the app developer may subsequently sever the connection. FIGS. 4 and 5 show example ways of severing the connection.

FIG. 4 shows an example process in which a webmaster severs the connection between a web site and an app.

At 402, the webmaster deletes a code from a list of legitimate codes. For example, with reference to FIG. 2, the webmaster may click the "X" next to the code that he or she wants to delete. The webmaster may have kept a record of which codes are associated with which apps, so he or she can disconnect a particular app from the web site by deleting the code for that app. (In one example, the web administrator portal may provide a place to record which apps are associated with which codes.) Once the code is deleted, the service ceases to use the relationship between the app and the web site when the service provides information (at 404). For example, if the service is a search engine, and if the service had previously returned the app as part of a search result that included the web site, the service will no longer return the app with the web site since the app has been disconnected from the web site.

FIG. 5 shows an example process in which an app developer severs the connection between a web site and an app.

At 502, the app developer removes a code from the published version of an app in an app store, or, alternatively, removes the app from the app store and republishes the app without the code. At 504, the app store may notify the service that the code has been removed from the app, thereby indicating that the code is no longer associated with the app. When the service receives this notification, the service then ceases to uses the relationship between the app and the web site when the service provides information (at 506).

Figure 6:
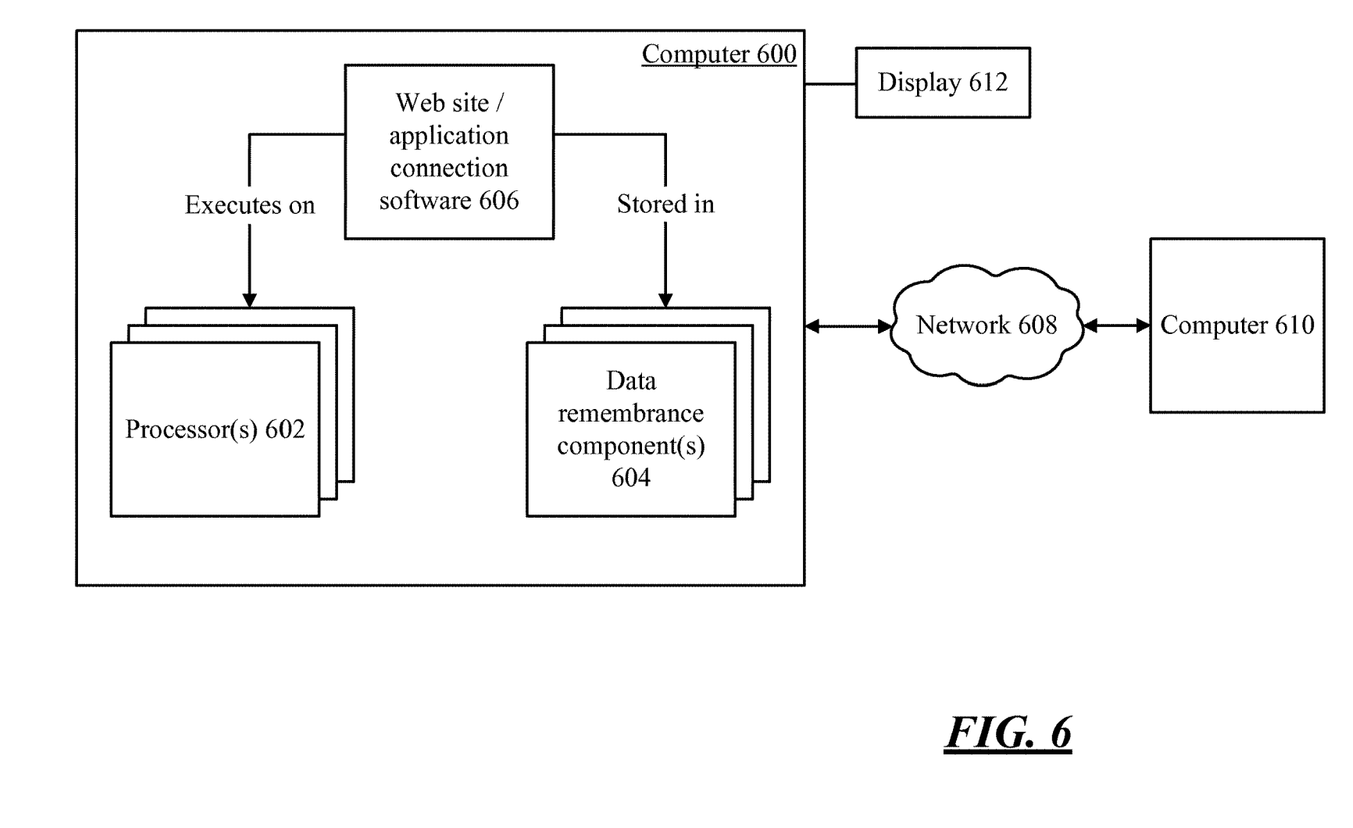
FIG. 6 is a block diagram of example components that may be used in connection with implementations of the subject matter described herein.

FIG. 6 shows an example environment in which aspects of the subject matter described herein may be deployed.

Computer 600 includes one or more processors 602 and one or more data remembrance components 604. Processor(s) 602 are typically microprocessors, such as those found in a personal desktop or laptop computer, a server, a handheld computer, or another kind of computing device. Data remembrance component(s) 604 are components that are capable of storing data for either the short or long term. Examples of data remembrance component(s) 604 include hard disks, removable disks (including optical and magnetic disks), volatile and non-volatile random-access memory (RAM), read-only memory (ROM), flash memory, magnetic tape, etc. Data remembrance component(s) are examples of computer-readable storage media. Computer 600 may comprise, or be associated with, display 612, which may be a cathode ray tube (CRT) monitor, a liquid crystal display (LCD) monitor, or any other type of monitor.

Software may be stored in the data remembrance component(s) 604, and may execute on the one or more processor(s) 602. An example of such software is web site/application connection software 606, which may implement some or all of the functionality described above in connection with FIGS. 1-5, although any type of software could be used. Software 606 may be implemented, for example, through one or more components, which may be components in a distributed system, separate files, separate functions, separate objects, separate lines of code, etc. A computer (e.g., personal computer, server computer, handheld computer, etc.) in which a program is stored on hard disk, loaded into RAM, and executed on the computer's processor(s) typifies the scenario depicted in FIG. 6, although the subject matter described herein is not limited to this example.

The subject matter described herein can be implemented as software that is stored in one or more of the data remembrance component(s) 604 and that executes on one or more of the processor(s) 602. As another example, the subject matter can be implemented as instructions that are stored on one or more computer-readable media. Such instructions, when executed by a computer or other machine, may cause the computer or other machine to perform one or more acts of a method. The instructions to perform the acts could be stored on one medium, or could be spread out across plural media, so that the instructions might appear collectively on the one or more computer-readable media, regardless of whether all of the instructions happen to be on the same medium. The term "computer-readable media" does not include signals per se; nor does it include information that exists solely as a propagating signal. It will be understood that, if the claims herein refer to media that carry information solely in the form of a propagating signal, and not in any type of durable storage, such claims will use the terms "transitory" or "ephemeral" (e.g., "transitory computer-readable media", or "ephemeral computer-readable media"). Unless a claim explicitly describes the media as "transitory" or "ephemeral," such claim shall not be understood to describe information that exists solely as a propagating signal or solely as a signal per se. Additionally, it is noted that "hardware media" or "tangible media" include devices such as RAMs, ROMs, flash memories, and disks that exist in physical, tangible form; such "hardware media" or "tangible media" are not signals per se. Moreover, "storage media" are media that store information. The term "storage" is used to denote the durable retention of data. For the purpose of the subject matter herein, information that exists only in the form of propagating signals is not considered to be "durably" retained. Therefore, "storage media" include disks, RAMs, ROMs, etc., but does not include information that exists only in the form of a propagating signal because such information is not "stored."

Additionally, any acts described herein (whether or not shown in a diagram) may be performed by a processor (e.g., one or more of processors 602) as part of a method. Thus, if the acts A, B, and C are described herein, then a method may be performed that comprises the acts of A, B, and C. Moreover, if the acts of A, B, and C are described herein, then a method may be performed that comprises using a processor to perform the acts of A, B, and C.

In one example environment, computer 600 may be communicatively connected to one or more other devices through network 608. Computer 610, which may be similar in structure to computer 600, is an example of a device that can be connected to computer 600, although other types of devices may also be so connected.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. One or more computer-readable media that store executable instructions to associate an app with a web site, the executable instructions, when executed by a computer, causing the computer to perform acts comprising: receiving a secret code at a web administrator portal of a service, said web administrator portal having verified a webmaster as being in control of said web site by giving said webmaster a specific file to post on said web site and the webmaster demonstrating control over the web site by posting the file on said web site; registering said secret code as identifying an app that said webmaster has agreed to associate with said web site, said secret code having been provided by said webmaster only to a developer of said app; receiving, from an app store at which said app is published, an indication that said developer provided said secret code to said app store at a time that said app was published, and that said app is associated with said secret code; using said service to provide information that identifies said web site; and based on said developer having provided said secret code to said app store in connection with said app, using said service to provide an indication of said app together with said information that identifies said web site.

2. The one or more computer-readable media of claim 1, said service being a search engine, said acts further comprising:
receiving a query; and
determining that said web site is responsive to said query, said service providing search results, one of said results comprising said information that identifies said web site and said indication of said app, said one of said results comprising said information that identifies said web site without said indication of said app in absence of a relationship between said app and said secret code.

3. The one or more computer-readable media of claim 1, said service being an advertising engine, said acts further comprising:
determining that an ad impression of said web site is to be displayed to a user; and
providing an impression of said indication of said app said developer having provided said secret code to said app store in connection with said app.

4. The one or more computer-readable media of claim 1, said secret code being received from said webmaster and being determined to conform to a constraint.

5. The one or more computer-readable media of claim 1, said acts further comprising:
providing, on said web administrator portal, a generate button that allows said webmaster to generate said secret code;
receiving an activation of said generate button; and
generating said secret code in response to activation of said generate button.

6. The one or more computer-readable media of claim 1, said acts further comprising:
determining that said app is not installed on a device to which said information that identifies said web site and said indication of said app are provided; and
providing, with said indication of said app, an activatable install button that, upon activation, installs said app on said device.

7. The one or more computer-readable media of claim 1, said acts further comprising:
receiving, from said webmaster, an indication that said secret code is to be revoked; and
based on said secret code having been revoked, ceasing to provide said indication of said app with said information that identifies said web site.

8. A method of associating an app with a web site, the method comprising: using a processor to perform acts comprising: generating a secret code at a web administrator portal of a service, said web administrator portal having verified a webmaster as being in control of said web site by giving said webmaster a specific file to post on said web site and the webmaster demonstrating control over the web site by posting the file on said web site; registering said secret code as identifying an app that said webmaster has agreed to associate with said web site, said code having been provided by said webmaster only to a developer of said app, said secret code not being made publicly known; receiving, from an app store at which said app is published, an indication that said developer provided said secret code to said app store at a time that said app was published, and that said app is associated with said secret code; using said service to provide information that identifies said web site; and based on said developer having provided said secret code to said app store in connection with said app, using said service to provide an indication of said app together with said information that identifies said web site.

9. The method of claim 8, said service being a search engine, said acts further comprising:
receiving a query; and
determining that said web site is responsive to said query, said service providing search results, one of said results comprising said information that identifies said web site and said indication of said app, said one of said results comprising said information that identifies said web site without said indication of said app in absence of a relationship between said app and said secret code.

10. The method of claim 8, said service being an advertising engine, said acts further comprising:
determining that an ad impression of said web site is to be displayed to a user; and
providing an impression of said indication of said app said developer having provided said secret code to said app store in connection with said app.

11. The method of claim 8, said secret code being received from said webmaster and being determined to conform to a constraint.

12. The method of claim 8, said acts further comprising:
providing, on said web administrator portal, a generate button that allows said webmaster to generate said secret code;
receiving an activation of said generate button; and
generating said secret code in response to activation of said generate button.

13. The method of claim 8, said acts further comprising:
determining that said app is not installed on a device to which said information that identifies said web site and said indication of said app are provided; and
providing, with said indication of said app, an activatable install button that, upon activation, installs said app on said device.

14. The method of claim 8, said acts further comprising:
receiving, from said webmaster, an indication that said secret code is to be revoked; and
based on said secret code having been revoked, ceasing to provide said indication of said app with said information that identifies said web site.

15. A system for associating an app with a web site, the system comprising: a memory; a processor; a component that is stored in said memory, that executes on said processor, said component receiving a secret code at a web administrator portal of a service, said web administrator portal having verified a webmaster as being in control of said web site by giving said webmaster a specific file to post on said web site, the webmaster demonstrating control over the web site by posting the file on said web site, said component registering said secret code as identifying an app that said webmaster has agreed to associate with said web site, said secret code having been provided by said webmaster only to a developer of said app, said secret code not being made publicly known, said component receiving, from an app store at which said app is published, an indication that said developer provided said secret code to said app store at a time that said app was published, and that said app is associated with said secret code, said component using said service to provide information that identifies said web site, and, based on said developer having provided said secret code to said app store in connection with said app, said component using said service to provide an indication of said app together with said information that identifies said web site, said component providing, on said web administrator portal, a generate button that allows said webmaster to generate said secret code, said component receiving an activation of said generate button, and said component generating said secret code in response to activation of said generate button.

16. The system of claim 15, said service being a search engine, said component receiving a query, and said component determining that said web site is responsive to said query, said service providing search results, one of said results comprising said information that identifies said web site and said indication of said app, said one of said results comprising said information that identifies said web site without said indication of said app in absence of a relationship between said app and said secret code.

17. The system of claim 15, said service being an advertising engine, said component determining that an ad impression of said web site is to be displayed to a user, and said component providing an impression of said indication of said app said developer having provided said secret code to said app store in connection with said app.

18. The system of claim 15, said secret code being received from said webmaster and being determined to conform to a constraint.

19. The system of claim 15, said component determining that said app is not installed on a device to which said information that identifies said web site and said indication of said app are provided, and said component providing, with said indication of said app, an activatable install button that, upon activation, installs said app on said device.

\* \* \* \* \*